United States Patent [19]

Wu et al.

[11] Patent Number: 4,556,111

[45] Date of Patent: Dec. 3, 1985

[54] METHOD FOR INHIBITING CORROSION

[75] Inventors: Yulin Wu; Paul R. Stapp, both of Bartlesville, Okla.

[73] Assignee: Phillips Petroleum Company, Bartlesville, Okla.

[21] Appl. No.: 645,731

[22] Filed: Aug. 30, 1984

[51] Int. Cl.[4] .................... C23F 11/12; E21B 41/02
[52] U.S. Cl. .................... 166/310; 166/371; 166/902; 252/8.55 E; 422/7
[58] Field of Search .................... 166/244 C, 279, 310, 166/371; 252/8.55 E, 396; 422/7

[56] References Cited

U.S. PATENT DOCUMENTS

| | | | |
|---|---|---|---|
| 2,133,734 | 10/1938 | Moser | 252/396 X |
| 2,321,577 | 6/1943 | Clayton et al. | 252/396 X |
| 3,322,793 | 5/1967 | Bozak | 252/396 X |
| 3,401,117 | 9/1968 | Schiff | 252/33 |
| 3,919,453 | 11/1975 | Bussell | 252/396 X |
| 3,985,504 | 10/1976 | Kindscher et al. | 252/396 X |
| 4,018,702 | 4/1977 | Boffardi et al. | 422/7 X |
| 4,214,876 | 7/1980 | Garth et al. | 252/396 X |
| 4,412,111 | 11/1968 | Irwin et al. | 252/396 X |
| 4,416,333 | 11/1983 | Mundhenk et al. | 166/371 X |
| 4,436,639 | 3/1984 | Oppenlaender et al. | 252/8.55 E |
| 4,460,482 | 7/1984 | Wu | 252/8.55 E |

*Primary Examiner*—George A. Suchfield
*Attorney, Agent, or Firm*—Howard D. Doescher

[57] ABSTRACT

A composition comprising the reaction adduct or neutralized product resulting from the reaction of a maleic anhydride and an oil containing a polynuclear aromatic compound is provided which, when applied to a metal surface, forms a corrosion-inhibiting film thereon. The composition is particularly useful in the treatment of down-hole metal surfaces in oil and gas wells to inhibit the corrosion of the metal.

11 Claims, No Drawings

METHOD FOR INHIBITING CORROSION

BACKGROUND OF THE INVENTION

This invention relates to the treatment of metal surfaces to increase their resistance to corrosion. It further relates to compositions which form a corrosion-resistant film on metal surfaces to which they are applied.

The problem of corrosion of metal surfaces in contact with air and water is well known. Corrosion and pitting are accelerated in environments in which metal surfaces are in contact with chemicals, such as hydrogen sulfide, carbon dioxide and organic acids and water having a high electrolyte concentration. Such environments are typical of down-well conditions in oil and gas wells in which corrosion of metal pipes, pumps and other equipment poses a serious problem requiring monitoring of well sites, frequent maintenance and costly replacement of parts. Oil recovery operations in deep-sea oil fields present these corrosion problems in their most extreme form. The down-well metal surfaces are in contact with large quantities of corrosive chemicals, such as dissolved acid gases present in the recovered oil and, in addition, the metal surfaces are subjected to temperatures of 250° F. or higher and pressures of 3,000 psig or higher, extreme conditions of temperature and pressure acting to accelerate corrosion and to intensify the problems of applying and maintaining chemical protection for the equipment. In off-shore oil wells secondary recovery operations involving waterflooding of the undersea formations subjects the down-well equipment to highly corrosive sea water containing dissolved oxygen.

Conventional corrosion-inhibiting agents are often not effective at all under such extreme conditions or reduce corrosion for only a short period of time and then must be reapplied often at great expense and inconvenience if the well site is not easily accessible or, as in the case of an off-shore well, poses difficulties of transporting and applying large volumes of chemicals.

Accordingly, an object of this invention is to provide compositions which can be applied to metal surfaces to inhibit corrosion and pitting of the metal.

Another object of this invention is to provide a method of treating metal surfaces so as to form a film which inhibits corrosion on the metal even under extreme conditions of temperature and pressure and in highly corrosive environments.

Other objects, aspects, as well as the several advantages of the invention will be apparent to those skilled in the art upon reading the specification and the appended claims.

SUMMARY OF THE INVENTION

According to the invention, there is provided a composition comprising the reaction product or adduct resulting from the reaction of a maleic anhydride and an oil containing at least about 5 weight percent of a polynuclear aromatic compound having a molecular weight of at least 155, which composition, when applied to a metal surface, forms a corrosion-inhibiting film on the metal surface.

Therefore, in one embodiment of the present invention, there are provided novel corrosion-inhibiting compositions useful for treatment of metal surfaces.

In another embodiment of this invention there are provided methods of treating metal surfaces with compositions that will provide a corrosion-inhibiting film on the surface of the metal.

The compositions of the invention can be applied by contacting a metal surface with the composition so that a film is formed thereon. The composition can be applied as one solution or by sequentially contacting the metal with a solution of the reaction adduct.

DESCRIPTION OF THE INVENTION

The invention corrosion-inhibiting composition comprises the reaction adduct resulting from the reaction of a maleic anhydride and an oil containing at least about 5 weight percent of a polynuclear aromatic compound having a molecular weight of at least 155. Alternatively, the neutralized reaction adduct can be used as a corrosion inhibitor.

Anhydrides which can be used in the practice of the invention include maleic anhydride and alkyl-substituted maleic anhydrides wherein the alkyl group contains from 1 to 6 carbon atoms and can be cyclic or acyclic. Such anhydrides can be represented by the formula

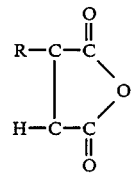

wherein R is selected from the group consisting of a hydrogen atom, and alkyl and cycloalkyl groups containing from 1 to 6 carbon atoms. Examples of said anhydrides include, among others, the following: maleic anhydride, methyl maleic anhydride (citraconic anhydride), ethyl maleic anhydride, butyl maleic anhydride, cyclobutyl maleic anhydride, hexyl maleic anhydride, cyclohexyl maleic anhydride, and the like. Maleic anhydride is presently preferred.

The oils used in the present invention containing the polynuclear aromatic compounds will contain at least about 5 weight percent of the polynuclear compound and preferably at least about 15 weight percent of such. The polynuclear aromatic compounds can be any fused-ring aromatic hydrocarbon having a molecular weight of at least 155. Generally they should be susceptible to either Diels Alder reactions or "ENE" type reactions with a maleic anhydride.

The type of oil which will contain the polynuclear aromatic compounds are known in the art and can vary widely within the context of the present invention. For example, extract oils, atmospheric gas oils, vacuum gas oils, various types of crude oils, coal liquids and shale oils can contain polynuclear aromatic compounds.

The process of forming the novel corrosion inhibitor involves reacting a maleic anhydride and an oil containing polynuclear aromatic compounds under conditions of time and temperature sufficient to form an adduct between the two compounds. This adduct can be referred to as a dicarboxylic anhydride reaction derivative.

Generally, the reaction temperature will be in the range of about 50° C. to about 250° C., preferably about 100°–200° C. The reaction time will generally be from about one hour to about 21 days, preferably about 1 to about 7 days.

Preferably, the above reaction is carried out in the presence of any diluent which is chemically inert, i.e., does not react chemically with a maleic anhydride, polynuclear aromatic compound or reaction product. Presently preferred diluents are unsubstituted, alkyl-substituted and halogenated aromatics. Examples of such diluents include benzene, toluene, the xylenes, chlorobenzene, o-dichlorobenzene, and the like, and mixtures thereof.

After the adduct is formed, any remaining unreacted maleic anhydride can be removed by sublimation, if desired, and the product can be isolated by extraction with a suitable extracting agent, e.g., aqueous alcoholic potassium hydroxide.

If desired, the adduct reaction product can be cooled and then neutralized to a pH of from about 7 to 13 with any basic neutralizing agent known in the art and then used as a corrosion-inhibiting composition. Examples of such neutralizing agents include sodium hydroxide, ammonium hydroxide, potassium hydroxide, calcium hydroxide or aqueous solutions of amines. Sodium hydroxide and ammonium hydroxide are presently preferred. The neutralizing agents are normally employed in an amount relative to the adduct within the range of from about 1:1 to 3:1, preferably about 1.9:1 to 2.2:1.

The invention composition is useful for coating oxidizable metal surfaces, particularly surfaces of objects made from iron and steel. It is particularly useful for treating metal surfaces such as metal pipes and casings in oil, gas and geothermal wells, which are subjected to high temperatures and pressure and corrosive chemical agents and for treating pipelines which carry fluids containing water.

In some treatment methods it is advantageous to employ a carrier liquid or drive fluid to force a slug of the corrosion-inhibiting composition down into the well being treated. Suitable diluents that can be used include hydrocarbons, such as isomeric xylenes, toluene, benzene, naphtha, fuel oil, diesel oil, heavy aromatic oils, Stoddard solvent, and crude oil. In view of practical and economic reasons, diesel oil, sea water or condensate from the well being treated are preferred carrier fluids. An inert gas, such as nitrogen, can be used as a drive fluid.

Down-hole treatments with the corrosion-inhibiting compositions can be effected by a variety of methods, depending upon the particular chemical and physical characteristics of the well being treated. The following down-hole treatment methods can be used to apply the composition to metal surfaces of equipment used to recover natural fluids from a subterranean reservoir.

Batch Treatment. The invention composition comprising the reaction adduct formed from a maleic anhydride and an oil containing a polynuclear aromatic compound and hydrocarbon diluent is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 1 hour.

Extended Batch Treatment. The invention composition is injected into the annular space of a cased wellbore, the well is closed off, and the composition is continuously circulated with well fluids down the annulus and up the tubing for an extended period of time which can vary widely but will usually be between 2 and 48 hours. At the end of the determined time period, the well is returned to production.

Squeeze Treatment. The invention composition is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment. A highly concentrated slug of the invention composition is injected into the tubing of a cased borehole and pressured down the tubing with nitrogen or a fluid column of a brine solution such as 2 weight percent aqueous potassium chloride. When the pressure is released, the aqueous brine column or nitrogen and the corrosion-inhibiting composition are produced up the tubing. The composition as a concentrated slug thus contacts the metal walls of the tubing and lays down a protective film as it flows in a downward and upward circuit.

Metal surfaces can also be protected by dipping or spraying the surfaces with the invention compositions and then allowing excess fluid to drain from the treated surfaces at ambient conditions. A protective film is thus formed on the metal surface without conventional heat-curing or extended air-drying treatment, although such drying treatments can be used if desired and if conditions permit it. The advantage in using an anti-corrosion system which does not require air- or heat-drying is that the system can be applied to metal surfaces which are hundreds or thousands of feet below ground level or in an environment which is always flooded with brine or other fluids.

When applying the composition to the metal tubing of, for example, a gas or oil well, it is not necessary to pre-coat the treated metal surfaces with oil or other substances prior to applying the invention composition, and the treated surfaces may or may not have an oil coating prior to the application. It is contemplated that the invention composition will provide effective corrosion inhibition in wells producing as much as 95 percent brine and 5 percent oil.

The following examples illustrate the present invention.

EXAMPLE I

This example describes the preparation of an adduct from the reaction of maleic anhydride and a refinery extract oil.

The extract oil had an API gravity of 13, specific gravity of 0.98, a 5% distillation point of 900° F. and 80% distillation point of 1100° F., an average molecular weight of 530–550, and a BMCI (Bureau of Mines Chemical Index) of 66. The latter is related to the aromaticity of the extract oil.

A charge of 480 g extract oil, 108 g maleic anhydride and 900 mL chlorobenzene was placed in a 2 liter round-bottomed flask equipped with a magnetic stirrer and fitted to a $\frac{3}{4}'' \times 12''$ unpacked distillation column.

The reaction mixture was boiled at reflux for a period of seven days. At the end of this reaction period, approximately 500 mL of the chlorobenzene was distilled off before removing the remaining chlorobenzene on a rotary evaporator. Unreacted maleic anhydride was removed in vacuo (0.2 mm/100° C.) over a period of 14.5 hours. The residue weighed 545.1 g.

A 369.7 g portion of the above residue was dissolved in 1500 mL of a 1:1 mixture of cyclohexane and toluene. This mixture was extracted three times with 650 mL aliquots of a 5% KOH solution in a 70:30 ethanol-water mixture. The combined aqueous alcoholic extracts were back-extracted one time with the cyclohexane-toluene mixture and all the organic layers were combined. The combined organic layers were stripped on a rotary evaporator to give 306.3 g of oil. This oil contained virtually no acidic components (neutralization equivalent 0.001 meq/g). The combined aqueous alcoholic extracts were stripped of volatiles on a rotary evaporator and the residual solution was acidified to a pH of about 2 with a 1:1 mixture of water and concentrated hydrochloric acid. The resulting black solid was collected on a Buchner funnel, washed with water and air-dried to give 64 g of product. This material had a neutralization equivalent of 2.50 meq/g.

EXAMPLE II

A charge of 40 g North Burbank Unit (NBU) topped crude oil, 4.5 g maleic anhydride and 75 mL ortho-dichlorobenzene was placed in a 250 mL round-bottomed flask equipped with a magnetic stirrer and fitted to a ¾"×12" unpacked distillation column. The reaction mixture was boiled at reflux for 72 hours. At the end of this reaction period, the ortho-dichlorobenzene was removed on a rotary evaporator at water aspirator pressure and ca. 100° C. (hot water bath). Unreacted maleic anhydride was removed in vacuo (0.2 mm/100° C.) over a period of 6 hours. The residue weighed 31.3 g. This material had a neutralization equivalent of about 0.33 meq/g.

EXAMPLE III

A charge of 40 g Nacotosh topped crude oil, 4.5 g maleic anhydride and 75 mL ortho-dichlorobenzene was placed in a 250 mL round-bottomed flask equipped with a magnetic stirrer and fitted to a ¾"×12" unpacked distillation column. The reaction mixture was boiled at reflux for 72 hours. At the end of this reaction period, the ortho-dichlorobenzene was removed on a rotary evaporator at water aspirator pressure and ca. 100° C. (hot water bath). Unreacted maleic anhydride was removed in vacuo (0.2 mm/100° C.) over a period of 7.5 hours. The residue weighed 41.3 g. This material had a neutralization equivalent of 0.57 meq/g.

Experimental Procedure

A series of laboratory corrosion inhibition tests were carried out in 1-liter Erlenmeyer flasks equipped with magnetic stirring bars, under laboratory conditions designed to simulate corrosive oil-water environments encountered in field drilling sites. A charge of 50 mL of crude oil and 950 mL of synthetic brine was used in each run. A slow stream of carbon dioxide was bubbled through the solution during each test to maintain the mixture near saturation with $CO_2$ at ambient conditions. After charging 950 mL of synthetic North Sea water (93.1 g $CaCl_2.2H_2O$, 46.4 g $MgCl_2.6H_2O$ and 781.1 g NaCl per 5 gal. distilled $H_2O$) into the Erlenmeyer flask, the inventive corrosion inhibiting composition was added followed by addition of crude oil. The rate of corrosion and pitting index were determined using a Corrater® monitoring system available from Rohrback Instruments. A carbon steel probe was suspended in the stirred oil-water mixture maintained at approximately 49° C. during each run.

EXAMPLE IV

This example discloses corrosion test results which substantiate the corrosion-inhibiting effectiveness of a maleic anhydride/refinery extract oil adduct. Results are summarized in Table I.

TABLE I

Maleic Anhydride/Extract Oil Adducts As Corrosion Inhibitors

| Run No. | Type of Run # | Additive | Corrosion Rate (mpy) | Pitting Index |
|---|---|---|---|---|
| 1 | Inv.[b,c] | Maleic Anhydride/ Extract Oil Adduct | 2 | 0.5 |
| 2 | Inv.[b,c] | Maleic Anhydride/ Extract Oil Adduct | 3 | 1 |
| 3 | C | None[a] | 30 | 3 |
| 4 | C[c] | Maleic Anhydride/ Petroleum Sulfonate Adduct | 17 | 1 |
| 5 | C[c] | Maleic Anhydride/ Petroleum Sulfonate Adduct | 20 | 4 |

\# Inv. represents "Inventive"; C represents "Control".
[a] This run contained 950 mL synthetic North Sea water and 50 mL of Teesside crude oil.
[b] The preparation of the maleic anhydride/extract oil adduct is described in Example I.
[c] A 1:1 v/v solution of the adduct in xylene was used as the stock solution. Individual 0.2 mL aliquots were introduced into the 1000 mL volumes of crude oil (50 mL) and brine (950 mL) test media to provide systems which were 200 ppm in inhibitor solution.

Referring to the invention runs 1 and 2 in Table I, it is evident that the maleic anhydride/extract oil adduct was a more effective corrosion inhibitor than was the maleic anhydride/petroleum sulfonate adduct of control runs 4 and 5. The control run 3 demonstrates the corrosion rate of a system containing no corrosion inhibitor additive.

That which is claimed is:

1. A method for treating and inhibiting the corrosion of metal surfaces in a well for the recovery of natural fluids from a subterranean formation, which comprises injecting into a well used a composition comprising the reaction adduct resulting from the reaction of a maleic anhydride and an oil containing at least about 5 weight percent of a polynuclear aromatic compound having a molecular weight of at least 155, and allowing the composition to contact the metal surfaces for a time sufficient to form a corrosion-inhibiting film thereon.

2. A method according to claim 1 wherein the composition is forced down the well using a drive fluid.

3. A method according to claim 1 wherein said reaction adduct is cooled and then neutralized to a pH of from about 7 to 13 with a basic neutralizing agent prior to injection into a well as the corrosion inhibiting composition.

4. A method for inhibiting corrosion of metal surfaces in a well producing natural fluids from a subterranean reservoir, which comprises the steps of:
   (a) stopping production of the natural fluids,
   (b) injecting into the well a composition comprising the reaction adduct resulting from the reaction of a maleic anhydride and an oil containing at least about 5 weight percent of a polynuclear aromatic compound having a molecular weight of at least 155, and (c) returning the well to production, thereby causing the composition to be returned with the natural fluids and to be deposited as a corrosion-inhibiting film enroute on metal surfaces with which it comes in contact.

5. A method according to claim 4 in which the composition is forced down the well using a drive fluid.

6. A method according to claim 4 in which the metal surfaces includes tubing within a well casing, the method further comprising injecting the composition containing reaction adduct through the tubing and between the tubing and casing for a time at least sufficient to form a corrosion-inhibiting film thereon before returning the well to production.

7. A method according to claim 6 wherein said composition is forced down the well using a drive fluid.

8. A method for treating a metal surface to inhibit corrosion thereof comprising contacting the metal surface with a composition comprising the reaction adduct resulting from the reaction of a maleic anhydride and an oil containing at least about 5 weight percent of a polynuclear aromatic compound having a molecular weight of at least about 155.

9. A method according to claim 8 wherein said oil contains at least about 15 weight percent of said polynuclear aromatic compound.

10. A method according to claim 8 wherein said oil is one selected from the group consisting of aromatic extract oils, atmospheric gas oils, vacuum gas oils, topped crude oils, shale oils and coal liquids.

11. A method according to claim 8 wherein said reaction is carried out at a temperature in the range of about 50°–250° C. for about one hour to about twenty-one days to form a dicarboxylic anhydride reaction product.

* * * * *